(12) United States Patent
Park (10) Patent No.: US 10,939,346 B1
(45) Date of Patent: Mar. 2, 2021

(54) REDUCING HIGH POWER USER EQUIPMENT INDUCED FREQUENCY INTERFERENCE

(71) Applicant: Sprint Spectrum LP, Overland Park, KS (US)

(72) Inventor: Justin Sungki Park, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 175 days.

(21) Appl. No.: 16/204,098

(22) Filed: Nov. 29, 2018

(51) Int. Cl.
*H04W 36/20* (2009.01)
*H04W 36/08* (2009.01)
*H04W 36/00* (2009.01)
*H04W 52/24* (2009.01)
*H04W 72/04* (2009.01)
*H04W 52/36* (2009.01)
*H04W 16/32* (2009.01)

(52) U.S. Cl.
CPC ....... *H04W 36/20* (2013.01); *H04W 36/0061* (2013.01); *H04W 36/08* (2013.01); *H04W 52/243* (2013.01); *H04W 52/365* (2013.01); *H04W 72/0453* (2013.01); *H04W 16/32* (2013.01)

(58) Field of Classification Search
CPC ................ H04W 36/00–385; H04W 52/00–50
See application file for complete search history.

(56) References Cited

U.S. PATENT DOCUMENTS

| | | | |
|---|---|---|---|
| 6,438,116 B1* | 8/2002 | Corbett | H04W 52/225 370/331 |
| 8,060,054 B1 | 11/2011 | Dinan et al. | |
| 8,363,622 B1 | 1/2013 | Oroskar et al. | |
| 8,768,402 B1 | 7/2014 | Wingo et al. | |
| 9,002,391 B1 | 4/2015 | Goyal et al. | |
| 9,078,220 B2 | 7/2015 | Makhlouf et al. | |
| 9,241,316 B1 | 1/2016 | Ray et al. | |
| 9,287,911 B1* | 3/2016 | Chindapol | H04B 1/10 |
| 9,578,558 B2 | 2/2017 | Seo et al. | |
| 9,775,121 B1 | 9/2017 | Cai et al. | |
| 9,999,000 B1 | 6/2018 | Oroskar et al. | |
| 10,015,070 B1* | 7/2018 | Cai | H04W 36/16 |
| 10,123,311 B1 | 11/2018 | Srinivas et al. | |
| 10,142,878 B1 | 11/2018 | Singh et al. | |
| 10,231,188 B1* | 3/2019 | Singh | H04W 52/245 |
| 2002/0042276 A1* | 4/2002 | Hakalin | H04W 16/08 455/453 |
| 2003/0137951 A1* | 7/2003 | Otsuka | H04W 36/18 370/328 |
| 2004/0097231 A1* | 5/2004 | Marque-Pucheu | H04W 36/30 455/436 |
| 2005/0277415 A1 | 12/2005 | Hamalainen et al. | |

(Continued)

Primary Examiner — Gennadiy Tsvey (57) ABSTRACT

Exemplary embodiments described herein include systems, methods, and processing nodes for reducing frequency interference in a wireless communication system. A high-power user equipment (HPUE) operating in an enhanced power mode with a first access node can be detected beyond the range of a low-power user equipment (LPUE) or a HPUE operating in a standard power mode. The HPUE can be handed over to a second, neighboring access node. A maximum allowable power of the HPUE can be reduced so that the HPUE is operating in a standard power mode.

18 Claims, 5 Drawing Sheets

(56) References Cited

U.S. PATENT DOCUMENTS

| | | | |
|---|---|---|---|
| 2006/0183496 A1* | 8/2006 | Muraoka | H04W 52/146 |
| | | | 455/522 |
| 2007/0123257 A1* | 5/2007 | Noll | H04W 36/0055 |
| | | | 455/436 |
| 2007/0218934 A1* | 9/2007 | Osaki | H04W 52/221 |
| | | | 455/522 |
| 2010/0233962 A1 | 9/2010 | Johansson et al. | |
| 2011/0021240 A1 | 1/2011 | Hiltunen et al. | |
| 2011/0211560 A1* | 9/2011 | Yamamoto | H04W 36/20 |
| | | | 370/332 |
| 2012/0213149 A1 | 8/2012 | Chakraborty et al. | |
| 2013/0010641 A1* | 1/2013 | Dinan | H04L 5/0007 |
| | | | 370/254 |
| 2013/0143572 A1* | 6/2013 | Kang | H04W 36/08 |
| | | | 455/437 |
| 2014/0031052 A1 | 1/2014 | Lagerqvist et al. | |
| 2014/0105040 A1* | 4/2014 | Baker | H04W 28/0221 |
| | | | 370/252 |
| 2015/0031410 A1 | 1/2015 | Lim et al. | |
| 2015/0092670 A1 | 4/2015 | Makhlouf et al. | |
| 2015/0103652 A1 | 4/2015 | Lee et al. | |
| 2016/0007253 A1* | 1/2016 | Asada | H04W 36/32 |
| | | | 455/437 |
| 2016/0029239 A1 | 1/2016 | Sadeghi et al. | |
| 2016/0373988 A1* | 12/2016 | Fudaba | H04W 36/22 |
| 2017/0012759 A1* | 1/2017 | Montaigne | H04W 72/1268 |
| 2017/0142632 A1* | 5/2017 | Panchal | H04L 5/0041 |
| 2018/0035387 A1* | 2/2018 | Yang | H04W 52/143 |

\* cited by examiner

REDUCING HIGH POWER USER EQUIPMENT INDUCED FREQUENCY INTERFERENCE

TECHNICAL BACKGROUND

As wireless networks evolve and grow in complexity, there are ongoing challenges associated with reaching targeted coverage levels. To boost coverage and enhance throughput in wireless networks, network operators have proposed deployment of high power user equipment (HPUE), wireless devices capable of transmitting at a maximum allowable transmit power that is higher than a current maximum allowable transmit power of off-the-shelf wireless devices and/or other currently deployed low power user equipment (LPUE). HPUE can cause undesirable interference to other wireless devices operating in a wireless network, particularly to LPUE that are utilizing the same frequency band or sub-band, or when both HPUE and LPUE are configured to utilize the same duplexing method, such as time division duplexing (TDD). Because HPUE have a greater potential range than LPUE in communicating above an acceptable quality threshold with a given access node, they can place a significant burden on the capacity of the access node while outcompeting LPUE.

OVERVIEW

Exemplary embodiments described herein include systems, methods, and processing nodes for reducing frequency interference in a communication system. A method can comprise detecting a high-power user equipment (HPUE) operating in an enhanced power mode in a second cell overlap region defined by a serving cell and a target cell neighboring and overlapping the serving cell, the HPUE in communication with a first access node of the serving cell. The serving cell can comprise the first access node, a serving cell low-power user equipment (LPUE) cell edge, and a serving cell HPUE cell edge. The target cell can comprise a second access node, a target cell LPUE cell edge, and a target cell HPUE cell edge. A first cell overlap region can be defined by the serving cell LPUE cell edge and the target cell LPUE cell edge. The second cell overlap region can be defined by the serving cell HPUE cell edge and the target cell LPUE cell edge. The second cell overlap region can comprise the first cell overlap region. An annular sector can comprise a portion of the second cell overlap region outside of the first overlap region. The HPUE can be handed over to the second access node. A maximum allowable power of the HPUE can be reduced so that the HPUE is operating in a standard power mode.

A communication system for reducing frequency interference is provided. The system can comprise a serving cell and a target cell. The serving cell can comprise a first access node, a serving cell low-power user equipment (LPUE) cell edge, and a serving cell high-power user equipment (HPUE) cell edge. The target cell, neighboring and overlapping the serving cell, can comprise a second access node, a target cell LPUE cell edge, and a target cell HPUE cell edge. The system can also comprise first and second cell overlap regions. The first cell overlap region can be defined by the serving cell LPUE cell edge and the target cell LPUE cell edge. The second cell overlap region can be defined by the serving cell HPUE cell edge and the target cell LPUE cell edge. The second cell overlap region can comprise the first cell overlap region. The system can further comprise an annular sector comprising a portion of the second cell overlap region outside of the first overlap region. The first access node can be configured to handover a HPUE in the annular sector operating in an enhanced power mode to the second access node.

A method of reducing frequency interference in a communication system is provided. The method can, for example, comprise the following steps. A high-power user equipment (HPUE) operating in an enhanced power mode with a first access node can be detected beyond the range of a low-power user equipment (LPUE) or a HPUE operating in a standard power mode. The HPUE can be handed over to a second, neighboring access node. A maximum allowable power of the HPUE can be reduced so that the HPUE is operating in the standard power mode.

DETAILED DESCRIPTION

The present disclosure is concerned with reducing frequency interference in a communication system in which adjacent cells may be using one or more carrier frequencies in common. There is a particular focus on such systems in which HPUE may be operating, because HPUE can extend the effective range of a particular cell and its node(s). HPUE can continue to operate, by their ability to operate in an enhanced power mode in communication with a first node in a first (serving) cell, well into a neighboring (second/target) cell whereas LPUE would have already been handed over to the neighboring cell to communicate through its second node. High-power user equipment (HPUE) operating in an enhanced power mode with a first access node can be detected by the first node beyond the range of a low-power user equipment (LPUE) or HPUE operating in a standard power mode. The present disclosure enables a reduction in frequency interference exacerbated by such HPUE through parameters governing the handover and maximum allowable power operation of HPUE. For example, HPUE can be handed over to a second, neighboring access node. Alternatively, or additionally, a maximum allowable power of HPUE can be reduced so that HPUE are forced to operate in the standard power mode.

A wireless communication system comprising HPUE can be visualized differently than a wireless communication system comprising only LPUE. The greater power operating capabilities of HPUE result in a greater potential cell radius for each cell in which the HPUE operate relative to the radius for a LPUE. The greater radii of HPUE systems, in turn, result in greater effective overlap regions between adjacent cells. A greater effective overlap region provides a larger area in which a handover can successfully occur. Although that larger area can enable a delay in which a handover occurs, it also increases the opportunity for frequency interference between neighboring cells operating on one or more common frequencies. Visualizing neighboring cells geometrically, as is done in FIG. 2, allows for a better appreciation of how coverage areas differ for LPUE and HPUE. These differences can collapse (coincide) when HPUE operate in a standard power mode. Reducing maximum allowable power is one strategy for coping with HPUE when handover to an adjacent cell is not possible or delayed.

Accordingly, the present disclosure provides systems and methods that enable better handling of HPUE in a wireless communication system. These systems and methods possess the flexibility to allow the operation of both LPUE and HPUE in a common environment while minimizing frequency interference. The order of handover and change in maximum allowable power of HPUE can be varied and modified for efficient management of the overall system. The systems and methods disclosed herein enable better handling of HPUE not just within a given wireless carrier, but also between different wireless carriers that may share the same geographic area. Adjacent, overlapping cells can exist within a network, as well as between networks.

Figure 1:
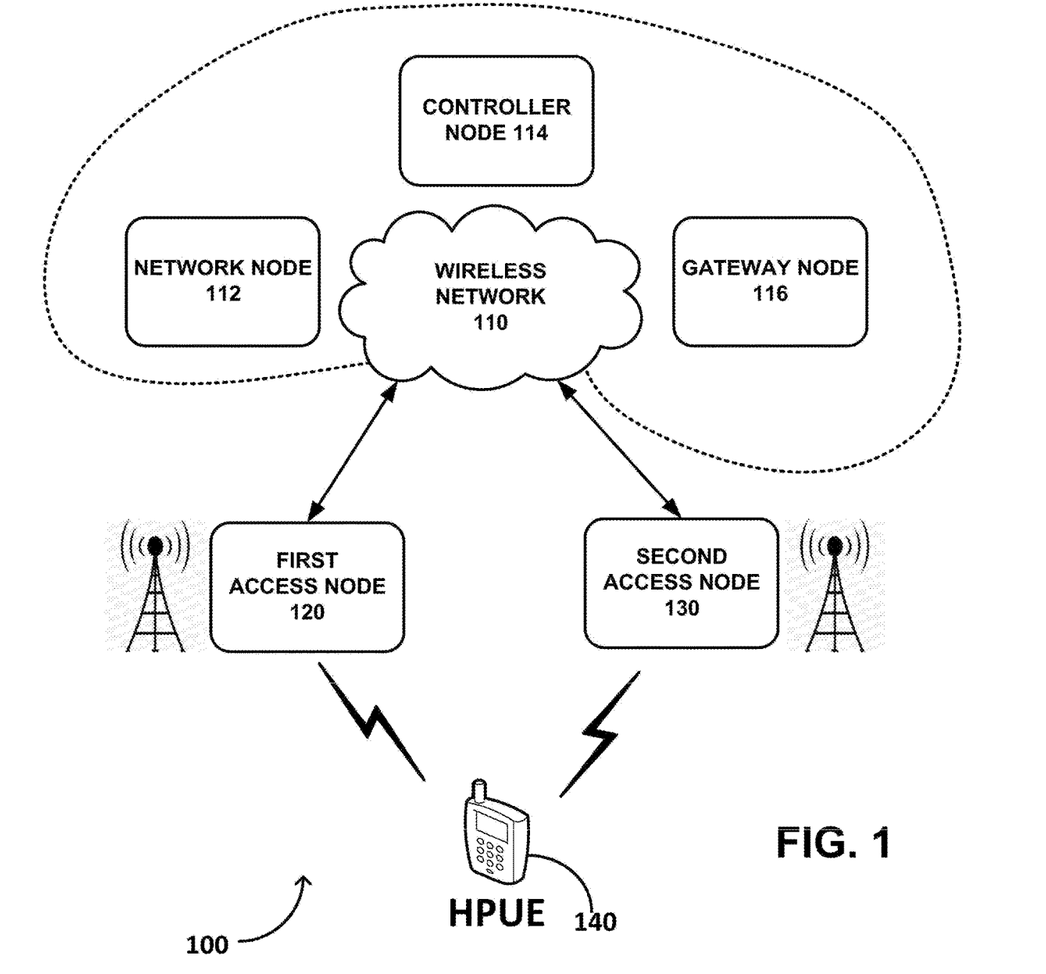
FIG. 1 is a schematic diagram depicting a communication system in accordance with the present disclosure.

Exemplary embodiments described herein include systems, methods, and processing nodes for reducing frequency interference in a communication system including for example, wireless cellular networks. A high-level schematic of a communication system 100 in accordance with the present disclosure is shown in FIG. 1. A wireless network 110 comprises or is in operable communication with a network node 112, a controller node 114, and a gateway node 116. Wireless network 110 is configured to communicate with first access node 120 and second access node 130, which in turn are configured to communicate with high-power user equipment (wireless device) 140.

Figure 2:
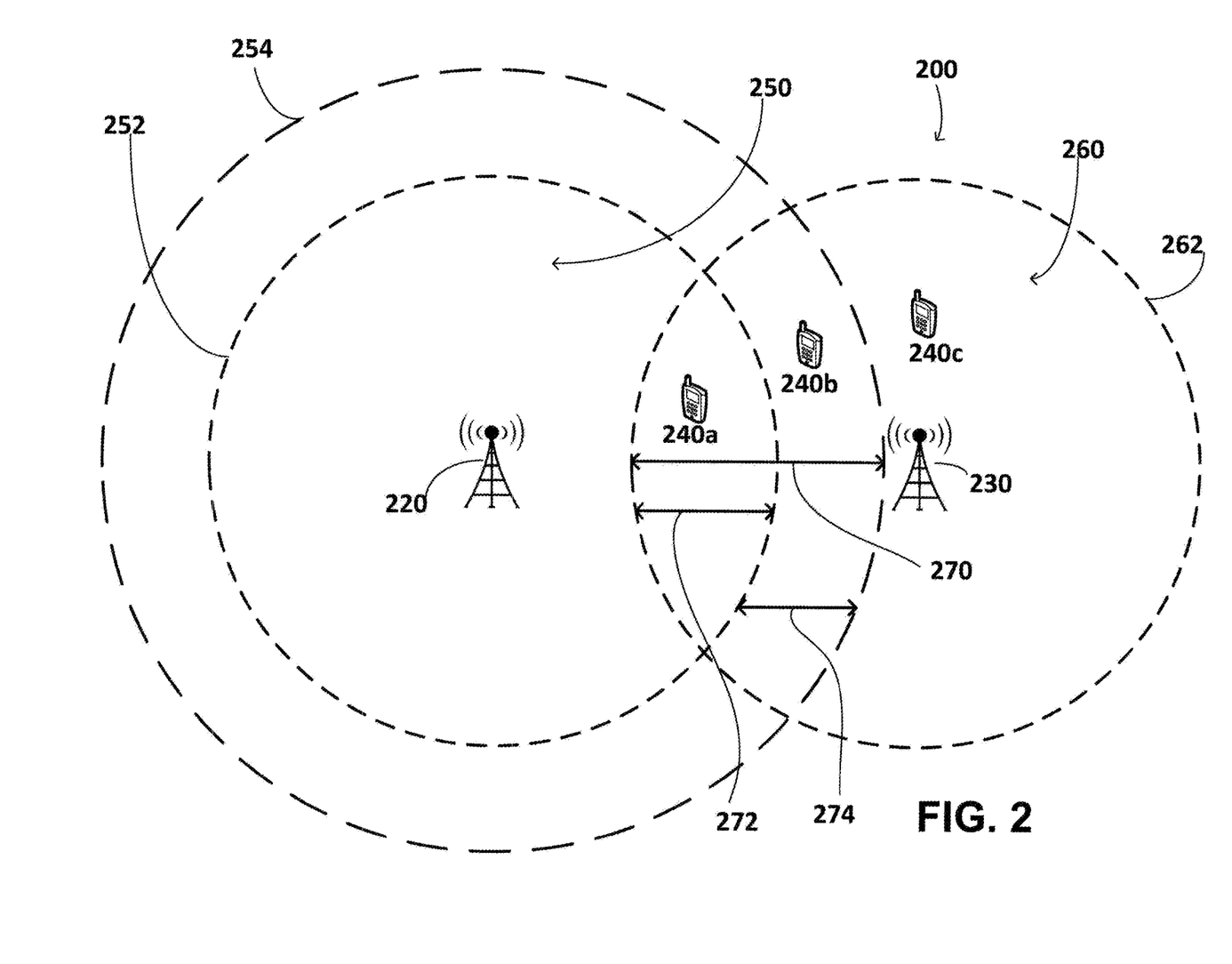
FIG. 2 is a schematic diagram depicting a wireless cellular network consistent in accordance with the present disclosure.

As shown in FIG. 2, for example, is a communication system 200, analogous to communication system 100 depicted in FIG. 1, for reducing frequency interference. System 200 can comprise a serving cell 250 and a target cell 260. Serving cell 250 can comprise a first access node 220, a serving cell low-power user equipment (LPUE) cell edge 252, and a serving cell high-power user equipment (HPUE) cell edge 254. Target cell 260, neighboring and overlapping serving cell 250, can comprise a second access node 230, a target cell LPUE cell edge 262, and a target cell HPUE cell edge. System 200 can also comprise first and second cell overlap regions 272, 270. First cell overlap region 272 can be defined by serving cell LPUE cell edge 252 and target cell LPUE cell edge 262. Second cell overlap region can be defined by serving cell HPUE cell edge 254 and the target cell LPUE cell edge 262. Second cell overlap region 270 can comprise first cell overlap region 272. System 200 can further comprise an annular sector 274 comprising a portion of second cell overlap region 270 outside of first overlap region 272. FIG. 2 depicts a HPUE 240 passing from serving cell 250 to target cell 260 in three stages as HPUEs 240 a, b, and c. For example, first access node 220 can be configured to handover HPUE 240b in annular sector 274 operating in an enhanced power mode to second access node 230.

Second access node 230 can be configured to, for example, reduce a maximum allowable power of HPUE 240b in annular sector 274 to operate in a standard power mode. Second access node 230 can also be configured to, for example, increase the maximum allowable power of the HPUE 240c so that the HPUE 240 is again permitted to operate in the enhanced power mode when the HPUE 240 a, b leaves second overlapping region 270. First and second access nodes 220, 230 can be configured to communicate on the same primary carrier frequency on uplink, downlink, or both. First and second access nodes 220, 230 can be configured to communicate on at least one secondary carrier frequency in common, on uplink, downlink, or both.

One or both of serving and target cells 250, 260 can be time division duplexing (TDD) cells. One or both of serving and target cells 250, 260 can be frequency division duplexing (FDD) cells. First and second access nodes 220, 230 can communicate on the same primary carrier frequency on uplink, downlink, or both. First and second access nodes 220, 230 can communicate on at least one secondary carrier frequency in common on uplink, downlink, or both. One or both of first and second nodes 220, 230 can communicate on downlink, uplink, or both using carrier frequency aggregation. At least one of the handover and the power decrease can occur when frequency interference measured at the first access node exceeds a threshold interference.

Exemplary embodiments can include any number of overlapping neighboring (adjacent) cells. For example, the system can further comprise a first common neighboring cell adjacent to both serving and target cells 250, 260. The first common neighboring cell can comprise a third access node, a first neighboring LPUE edge, and a first neighboring HPUE edge. The first neighboring LPUE edge can further define a first annular sector segment. Annular sector 274 can comprise the first annular sector segment. At least one of the handover and the allowable power reduction can occur in the first annular sector segment. The system can, for example, further comprise a second common neighboring cell adjacent to both serving and target cells 250, 260. The second common neighboring cell can comprise a fourth access node, a second neighboring LPUE edge, and a second neighboring HPUE edge. The second neighboring LPUE edge can further define a second annular sector segment. The first annular sector segment can comprise the second annular sector segment. At least one of the handover and the allowable power reduction can occur in the second annular sector segment.

Exemplary embodiments can include any number or kind of cell. One or both of serving and target cells 250, 260 can be omnidirectional cells. One or both of serving and target cells 250, 260 can be sectorized cells. For example, a sectorized cell can be about 60 degrees, about 90 degrees, about 120 degrees, about 180 degrees, about 270 degrees, or any other angle between 0 and 360 degrees. Sectorized cells in the system can be oriented in a common grid system relative to true north. Although certain figures show embodiments as employing omnidirectional cells, that is for simplicity of illustration, and such embodiments can also employ sectorized cells, and vice versa.

A communication system in accordance with the present disclosure, for example, can comprise a plurality of coverage areas comprising a plurality of central loci. The communication system can further comprise a plurality of cells comprising a plurality of access nodes. The plurality of cells can comprise the serving and target cells. The plurality of access nodes can comprise the first and second access nodes. Each cell of the plurality cells can be, for example, a sectorized cell. Each coverage area can comprise at least two access nodes at a central locus and at least two sectorized cells. The plurality of coverage areas can comprise a first and a second coverage area. The first coverage area can comprise a first central locus. The second coverage area can comprise a second central locus. The first access node can be at the first central locus. The second access node can be at the second central locus. The first coverage area can comprise the serving cell. The second coverage area can comprise the target cell. Each coverage area can comprise, for example, three sectorized cells and three access nodes at each central locus from which the sectorized cells originate. Each sectorized cell can have, for example, an angle of approximately 120 degrees emanating from its respective access node. The plurality of cells can be oriented from true north at a common set of three grid angles.

The plurality of sectorized cells in the communication system can comprise, for example, a plurality of LPUE cell edges and a plurality of HPUE cell edges. The plurality of LPUE cells edges can comprise the serving and target LPUE cell edges. The plurality of HPUE cells edges can comprise the serving and target HPUE cell edges. Each LPUE cell edge of the plurality of LPUE edges can comprise a LPUE arc edge, a first radial LPUE edge, and a second radial LPUE edge. Each HPUE cell edge of the plurality of HPUE edges can comprise a HPUE arc edge, a first radial HPUE edge, and a second radial HPUE edge. The pluralities of LPUE and HPUE cell edges can define a plurality of first cell overlap region s comprising the first cell overlap region, a plurality of annular sectors, and a plurality of second cell overlap regions. The plurality of second cell overlap regions can comprise the second cell overlap region. A plurality of annular sectors can comprise the annular sector. The plurality of second cell overlap regions can comprise the plurality of first cell overlap regions and the plurality of annular sectors.

HPUE and LPUE can be implemented using, for example, Third Generation Partnership Project Long Term Evolution (3GPP LTE) network architecture and/or protocol. LTE can be standard LTE or LTE Advanced. For example, LPUE (e.g., off-the-shelf and/or other legacy wireless devices already compliant with the power-leakage mandates) can be defined in LTE as power class 3 and/or power class 4 wireless devices. Power class 3 and/or power class 4 wireless devices can be configured (in LTE) with a maximum allowable transmit power level of +23 dBm for network operating (or carrier) Bands I-III with a nominal power tolerance of ±2 dB (e.g., for E-UTRA bands), as illustrated in Table 1. HPUE can be defined in LTE as power class 1 and/or power class 2 wireless devices. Power class 1 and/or power class 2 wireless devices can be configured (in LTE) with a maximum allowable transmit power of +26 dBm for network operating (or carrier) Bands I-II with a nominal power tolerance ±2 dB (e.g., for E-UTRA bands), as illustrated in Table 1. HPUE and LPUE are not limited to any specific technology architecture, such as LTE, and can be used with any network architecture and/or protocol.

For example, those wireless devices reporting a greater current transmit power state or power headroom than other wireless devices operating within the coverage area of the access node can be classified (or grouped) as HPUE (e.g., power class 1 or power class 2 wireless devices, illustrated in Table 1).

The maximum allowable power of the HPUE in the enhanced power mode can differ from the maximum allowable power in the standard power mode by, for example, at least 0.5 dB, at least 1.0 dB, at least 1.5 dB, at least 2.0 dB, at least 2.5 dB, at least 2.75 dB, at least 3.0 dB, at least 3.25 dB, at least 3.5 DB, at least 3.75 dB, at least 4 dB, at least 4.0 dB, at least 5 dB, at least 6 dB, at least 7.5 dB, or at least 10 dB. Such differences can also apply to differences in maximum power potential (capability) of a HPUE versus a LPUE.

Referring again to FIG. 1, wireless devices, HPUE or LPUE, can include a cell phone, a smart phone, a computing platform such as a laptop, a palmtop, or a tablet, a personal digital assistant (PDA), an internet access device, and combinations thereof. Wireless devices can transmit and/or receive information over the communication system using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, news alerts, and the like.

A wireless interface of wireless devices can include one or more transceivers for transmitting and receiving data over the communication system. Each transceiver can be associated with the same or different frequency bands, the same or different radio access technologies, the same or different network providers (or network operators), and/or the same or different services. For example, wireless devices can include a transceiver that is associated with one or more of the following: CDMA, GSM, WiMAX, 3GPP LTE, and/or HSPA, IEEE 802.11, WiFi, Bluetooth, Zigbee, IrDA, MBMS, and the like.

Access nodes can be any network node configured to provide communication between wireless devices and the wireless network. Access nodes can be short range access nodes or standard access nodes. A short-range access node can include a microcell base station, a picocell base station, a femtocell base station, relay node, or the like. A standard access node could include base transceiver stations, radio base stations, radio network controllers, an eNodeB device,

TABLE 1

| | Power Class 1 Wireless Device | | Power Class 2 Wireless Device | | Power Class 3 Wireless Device | | Power Class 4 Wireless Device | |
|---|---|---|---|---|---|---|---|---|
| Operating Band | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

Wireless devices can use periodic and/or event-triggered PHR and/or ePHR messaging to report a current transmit power state or power headroom at first and second access nodes. Based on the current transmit power state or power headroom reported at first and second access nodes 220, 230 (e.g., using PHR and/or ePHR messaging), an access node can classify (or group) wireless devices as HPUE or LPUE.

or an enhanced eNodeB device, a donor eNodeB, or the like. Access nodes can use data scheduler(s) and/or coordinate with a scheduler node to communicate scheduling decisions (e.g., upload/download (UL/DL) scheduling assignments) to wireless devices using control information carried by an UL/DL control channel. Access nodes can collect and store maximum allowable transmit power (e.g., associated with a defined power class of wireless device) and/or data related to capacity/delay characteristics (e.g., an amount of data buffered per wireless device, a RF signal quality of the wireless device, buffer delay or period of time from receipt of a last data packet at the wireless device, access node sector throughput, cell-edge wireless device user experience, guaranteed bit rate/non-guaranteed bit rate, backhaul limitations/capacity, wireless device mobility, and the like) of wireless devices, reported (or collected) at the access nodes.

Access nodes can comprise a processor and associated circuitry to execute or direct the execution of computer-readable instructions to obtain information. Access nodes can retrieve and execute software from storage, which can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof. Access nodes can receive instructions and other input at a user interface.

A wireless network can have wired and/or wireless communication network components, and can comprise processing nodes, routers, gateways, and physical and/or wireless data links for carrying data among various network elements, including combinations thereof, and can include a local area network (LAN), a wide area network (WAN), and an internetwork (including the Internet). Wireless network 110 can be capable of carrying data, for example, to support voice, push-to-talk, broadcast video, and data communications by a wireless device, for example, wireless devices. Wireless network protocols can comprise Code Division Multiple Access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G NR in SA (Stand Alone) or 5G EN-DC in NSA (Non-Stand Alone)). Wired network protocols that can be utilized by wireless network comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Wireless network 110 can also comprise additional base stations, controller nodes, telephony switches, internet routers, network gateways, computer systems, communication links, or some other type of communication equipment, and combinations thereof.

Network node 112 can be any network node configured to communicate information and/or control information over system 100 or 200. For example, network node 112 can receive and/or transmit information to/from wireless devices over the communication system. While network node 112 is shown in the backhaul of system, network 112 node could alternatively be located between access nodes and wireless network. Network node 112 can be a standalone computing device, computing system, or network component, and can be accessible, for example, by a wired or wireless connection, or through an indirect connection such as through a computer network or wireless network. For example, network node can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, or the like. Network node 112 is not limited to any specific technology architecture, such as LTE, and can be used with any network architecture and/or protocol.

Communication links can be wired or wireless and use various communication protocols such as Internet, Internet Protocol (IP), LAN optical networking, Hybrid Fiber Coax (HFC), telephony, T1, or some other communication format—including combinations, improvements, or variations thereof. Wireless communication links can be a radio frequency, microwave, infrared, or other similar signal, and can use a suitable communication protocol, for example, GSM, CDMA, WiMAX, LTE, or combinations thereof. Other wireless protocols can also be used. Links can be a direct link or might include various equipment, intermediate components, systems, and networks.

A scheduler node can be included in the backhaul of the communication system. The communications between high power wireless devices or low power wireless devices can be relayed, monitored, inspected, and/or scheduled by an inspection module or node at access nodes and/or a data scheduler or scheduler node. Other network elements can be present in the communication system to facilitate communication but are omitted for clarity, such as controller nodes, base stations, base station controllers, gateways, MSC, DAP, and location registers such as a HLR or VLR. Furthermore, other network elements can be present to facilitate communication between high power wireless devices and/or low power wireless devices, access nodes, and the wireless network.

A gateway node can be any network node configured to interface with other network nodes using various protocols. Gateway node 116 can communicate user data over system. Gateway node 116 can be a standalone computing device, computing system, or network component, and can be accessible, for example, by a wired or wireless connection, or through an indirect connection such as through a computer network or communication network. For example, a gateway node can include a Serving Gateway (SGW) and/or a Packet Data Network Gateway (PGW), etc. Gateway node 116 is not limited to any specific technology architecture, such as LTE, and can be used with any network architecture and/or protocol. Multiple gateway nodes can be in communication with the wireless network. Gateway node 116 can comprise a processor and associated circuitry to execute or direct the execution of computer-readable instructions to obtain information. Gateway node 116 can retrieve and execute software from storage, which can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof. Gateway node 116 can receive instructions and other input at a user interface.

A controller node can be any network node configured to communicate information and/or control information over the communication system. Controller node 114 can be configured to transmit control information associated with a handover procedure. Controller node 114 can be a standalone computing device, computing system, or network component, and can be accessible, for example, by a wired or wireless connection, or through an indirect connection such as through a computer network or communication network. For example, a controller node 114 can include a MME, a HSS, a PCRF, an AAA node, a RMS, a SPS, a policy server, or the like. Controller node 114 is not limited to any specific technology architecture, such as LTE and can be used with any network architecture and/or protocol. Multiple controller nodes could be in communication with wireless network 110.

Controller node 114 can comprise a processor and associated circuitry to execute or direct the execution of computer-readable instructions to obtain information. Controller node 114 can retrieve and execute software from storage, which can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof. Controller node 114 can receive instructions and other input at a user interface.

An access node can be in communication with a gateway node through a communication link and with a controller node through a communication link. A first access node can be in communication with a second access node through a communication link. A gateway node can be in communication with a controller node through a communication link and a wireless network. The communication links can be wired or wireless links and use various communication protocols such as Internet, IP, LAN, optical networking, HFC, telephony, T1, or some other communication format— including combinations, improvements, or variations thereof. The links can be a radio frequency, microwave, infrared, or other similar signal, and can use a suitable communication protocol, for example, GSM, CDMA, WiMAX, or LTE, or combinations thereof. Other wireless protocols can also be used. The links can be a direct link. The links can include various equipment, intermediate components, systems, and networks.

An access node of a home wireless network can de-prioritize high power roaming wireless devices for wireless resource grants compared to (or over) HPUE and/or LPUE that have an established communication session with a home wireless network; and/or (ii) use the calculated scheduling weights (or factors) to distribute wireless resources equally to high power home wireless devices and low power home wireless devices reporting a same (or similar) CQI value, a same (or similar) maximum allowable transmit power level, and/or same (or similar) capacity/delay characteristics at a home access node.

Other network elements can be present in the communication system to facilitate communication, such as controller nodes, base stations, base station controllers, gateways, mobile switching centers (MSC), dispatch application processors (DAP), and location registers such as a home location register (HLR) or visitor location register (VLR). Other network elements can be present to facilitate communication between high power wireless devices and/or low power wireless devices, access nodes, scheduler nodes, wireless networks, and network nodes, including additional processing nodes, routers, gateways, and physical and/or wireless data links for carrying data among the various network elements.

Figure 3:
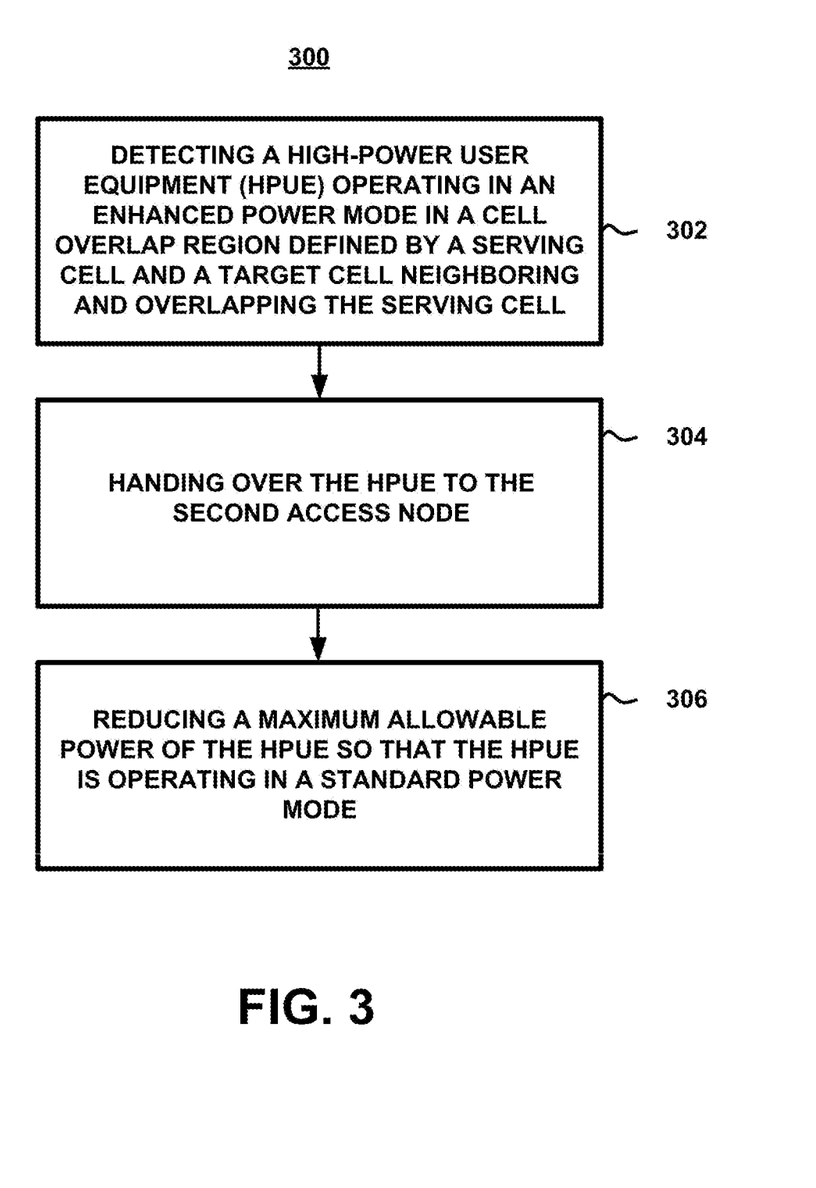
FIG. 3 is a flowchart depicting a method for reducing frequency interference in a communication system in accordance with the present disclosure.

As depicted in FIG. 3 in accordance with the present disclosure, for example, a method 300 can comprise a step 302 of detecting a high-power user equipment (HPUE) operating in an enhanced power mode in a second cell overlap region defined by a serving cell and a target cell neighboring and overlapping the serving cell, the HPUE in communication with a first access node of the serving cell. The serving cell can comprise the first access node, a serving cell low-power user equipment (LPUE) cell edge, and a serving cell HPUE cell edge. The target cell can comprise a second access node, a target cell LPUE cell edge, and a target cell HPUE cell edge. A first cell overlap region can be defined by the serving cell LPUE cell edge and the target cell LPUE cell edge. The second cell overlap region can be defined by the serving cell HPUE cell edge and the target cell LPUE cell edge. The second cell overlap region can comprise the first cell overlap region. An annular sector can comprise a portion of the second cell overlap region outside of the first overlap region. The HPUE can be handed over to the second access node in a step 304. A maximum allowable power of the HPUE can be reduced so that the HPUE is operating in a standard power mode in a step 306.

The detecting can occur when the HPUE is in the first cell overlap region. Although detection can occur in the serving cell before the HPUE enters the first cell overlap region, the first overlap region is potentially more relevant because any interference with other wireless devices in the serving cell can be addressed by initiating a handover to a neighboring cell in addition to or in the alternative to reducing the maximum allowable power of the HPUE. The first cell overlap region provides the option of a handover. The handover can occur in the first cell overlap region or be delayed until the HPUE reaches the annular sector. The timing of the handover can be determined by or take into consideration one or more of the relative number of wireless devices in the serving cell and the target cell, a LTE trigger, and measured interference in the serving cell relative to the target cell. Internodal interference, that is, interference between the serving cell and the target cell, can be alternatively or additionally considered.

When considering the number of wireless devices in each cell, a greater weight can be assigned to a HPUE relative to a LPUE. For example, if a LPUE is assigned a weight of 1.0, the HPUE could be assigned a weight of 1.25, 1.5, 2.0, a weight between 1.0 and 2.0, or another weight. If the total number of wireless devices (weighted or unweighted) and/or the interference is greater in the serving cell, the handover can be performed in the first cell overlap region. If the total number of wireless devices (weighted or unweighted) and/or the interference is greater in the target cell, the handover can be performed in the annular sector, aborted, or a search for another, less burdened target cell can be performed.

The detecting can occur, for example, when the HPUE is in second cell overlap region. Detection of a HPUE can be continuous such that the detecting essentially becomes tracking of the HPUE through a wireless network regardless of the particular cell or portion thereof in which the HPUE is located at any particular moment. Alternatively, detection of the HPUE can be intermittent. Hybrid approaches can also be employed. For example, detection of the HPUE can be intermittent until the HPUE reaches the second overlapping region, or portion thereof, in which detection (tracking) can be continuous until the HPUE leaves the second overlapping region or portion thereof. The switch to or from intermittent and continuous detection of the HPUE can also occur upon handover and/or change in power mode operation. Detection of the HPUE in the second cell overlap region, including both the first cell overlap region and the annular sector, is advantageous because a handover can generally be initiated to a neighboring cell.

The detecting can occur, for example, when the HPUE is in the annular sector. Detection of the HPUE in the annular sector can be sufficient for reducing interference in the serving cell or between the two cells. Once the HPUE is in the annular sector, the HPUE is generally beyond the range of LPUE in the serving cell. Thus, the HPUE in the annular sector can pose less of an interference issue to LPUE especially for LPUE close to the first access node. HPUE detected in the annular sector can be prioritized for handover to the target cell and/or for reduction of maximum allowable power. For example, upon detection in the annular sector, handover and/or maximum allowable power reduction can be initiated without delay or with less of a delay than if the HPUE had been detected in the first cell overlap region.

The handover of the HPUE can occur, for example, before the allowable power reduction. That is, the allowable power reduction can occur after the handover. For example, after the HPUE is detected in the first cell overlap region, the HPUE can be handed over either in the first overlap region or the annular sector. After handover, the reduction in maximum allowable power can occur immediately or with a chosen delay. The delay can be time-based or trigger-based, for example, upon exceeding a predetermined interference threshold. The handover can occur, for example, in the first cell overlap region, and the reduction in maximum allowable power can occur in the annular sector.

The handover of the HPUE can occur, for example, after the allowable power reduction. That is, the allowable power reduction can occur before the handover. By reducing the maximum allowable power first, less strain is placed on both the serving and target cells. Even if there remain a large number of total wireless devices in the serving cell, fewer HPUEs operating in an enhanced power mode can result in less interference in the serving cell. Additionally, by reducing the maximum allowable power before the handover, once the handover occurs, the target cell only experiences an added burden equivalent to another LPUE operating (communicating) with the second access node. When the allowable power reduction occurs before the handover, the handover can occur immediately after the allowable power reduction occurs or after a delay. The delay can be time-based or trigger-based. For example, handover can occur after a predetermined time has elapsed after the maximum allowable power reduction or after a predetermined threshold, such as a frequency interference threshold, is exceeded.

At least one of the detecting, handover, and the allowable power reduction can occur when the HPUE is in the annular sector. For example, the allowable power reduction can occur in the annular sector, and the method can further comprise increasing the maximum allowable power of the HPUE so that the HPUE is again permitted to operate in the enhanced power mode when the HPUE leaves the second cell overlap region. The allowable power increase can occur, for example, when the frequency interference measured at the second access node drops below a threshold interference after the HPUE leaves the second cell overlap region.

Triggering the handover of the wireless device to the second access node can include adjusting one or more handover thresholds for the HPUE. For example, the handover thresholds can be adjusted such that the HPUE is encouraged to initiate a handover to the second access node. Adjusting the handover threshold can include increasing or raising a threshold signal level associated with the first access node, such that a measured signal level of the first access node becomes less than a minimum threshold level set for the HPUE to stay attached to the first access node. The adjustment can comprise decreasing or lowering a threshold signal level of the second access node, such that a measured signal level of the second access node becomes higher than a minimum threshold level set for the HPUE to request the handover. The adjusted handover thresholds can be transmitted to the HPUE via a control message by one or more access nodes. The HPUE can report signal level measurements of different access nodes, and handovers performed or prevented based on the updated thresholds.

Other combinations of handover triggers can be performed. Examples of threshold, offsets, triggers and the like can include one or more of LTE parameters or events A1, A2, A3, A4, A5, A6, B1, B2, C1, C2, W1, W2, W3, V1, and V2. For example, the triggers can comprise thresholds, offsets, or hysteresis values for an A4 measurement event, A5 measurement event, B1 measurement event, or B2 measurement event (e.g., when implementing an LTE network). A HPUE, for example, can be handed over from a first access node based on a triggered A5 event. A received first signal level plus a hysteresis can be compared to a first threshold and a received second signal level plus offsets minus a hysteresis can be compared to a second threshold. The first received signal level can comprise a received signal level from the first access node and the second received signal level can comprise a received signal level from the second access node, where the first and seconds signals are received at the wireless device. Some example signal levels can comprise a Received Signal Strength Indicator, (RSSI), Reference Signal Received Quality (RSRQ), Reference Signal Received Quality (RSRP), or any other suitable signal level.

Figure 4:
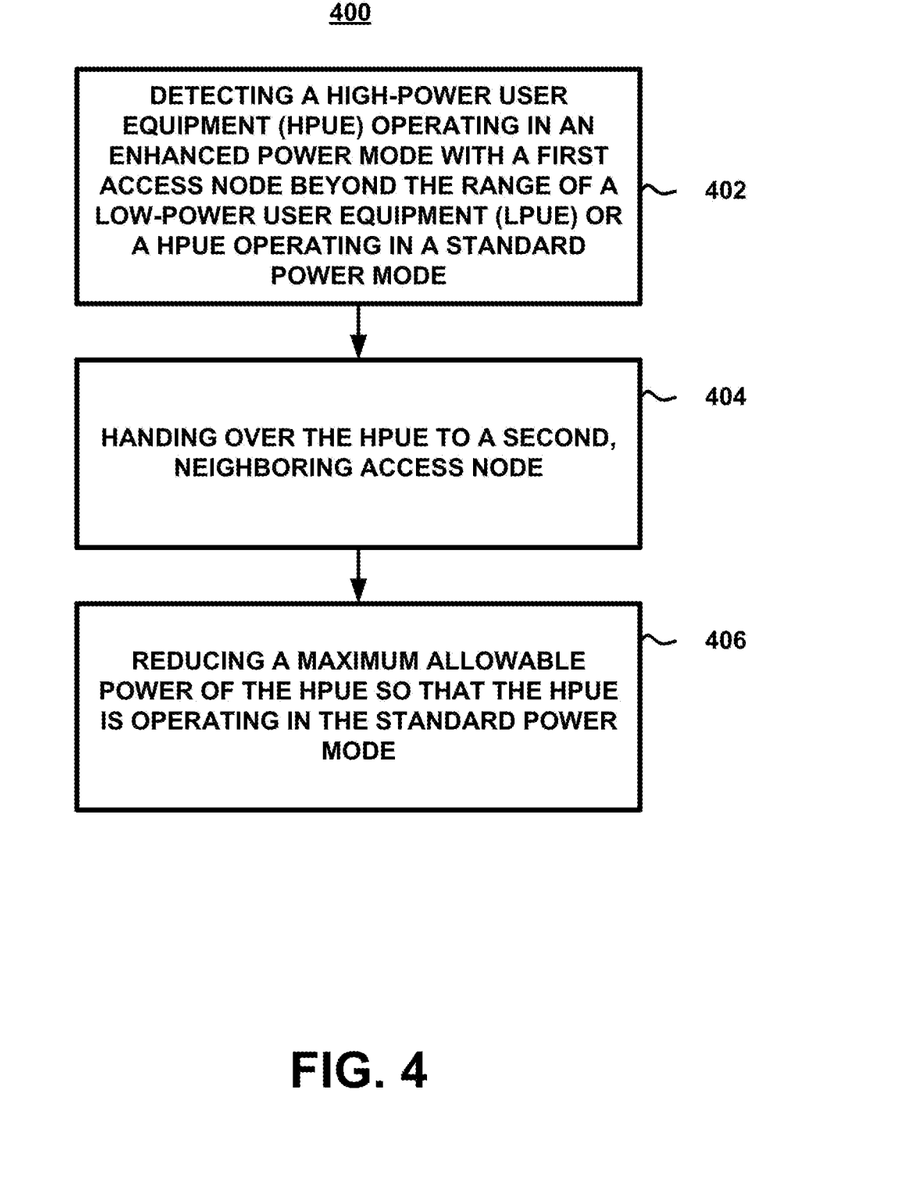
FIG. 4 is a flowchart depicting a method for reducing frequency interference in a communication system in accordance with the present disclosure.

In FIG. 4 in accordance with the present disclosure, a method 400 of reducing frequency interference in a communication system is provided. The method can, for example, comprise the following steps. In a step 402, a high-power user equipment (HPUE) operating in an enhanced power mode with a first access node can be detected beyond the range of a low-power user equipment (LPUE) or a HPUE operating in a standard power mode. The HPUE can be handed over to a second, neighboring access node in a step 404. A maximum allowable power of the HPUE can be reduced so that the HPUE is operating in the standard power mode in a step 406. The first and second access nodes can communicate on the same primary carrier frequency, at least one common secondary carrier frequency, or both. At least one of the handover and the power decrease can occur when frequency interference measured at the first access node exceeds a threshold interference.

A high-power user equipment (HPUE) operating in an enhanced power mode with a first access node can be detected beyond the range of a low-power user equipment (LPUE) or a HPUE operating in a standard power mode. The detection can be performed by the first node of the serving cell, the second node of the target cell or both. Detection of a HPUE beyond the range of the a LPUE can make the HPUE a candidate for handover, a reduction in maximum allowable power, or both. Detection of a HPUE can be continuous such that the detecting essentially becomes tracking of the HPUE through a wireless network regardless of the particular cell or portion thereof in which the HPUE is located at any particular moment. Alternatively, detection of the HPUE can be intermittent. Hybrid approaches can also be employed. For example, detection of the HPUE can be intermittent until the HPUE reaches a point in the target cell in which LPUE can no longer communicate with the serving cell above an acceptable quality of service (QOS) or other relevant threshold. Detection of the HPUE can then become continuous until the HPUE can no longer communicate with the serving cell above an acceptable quality of service (QOS) or other relevant threshold. The switch to or from intermittent and continuous detection of the HPUE can also occur upon handover and/or change in power mode operation.

The HPUE can be handed over to a second, neighboring access node in order to reduce interference in the serving cell, to reduce interference between the serving cell and any neighboring cells (internodal interference), to reduce the total number wireless devices in the serving cell, to prevent exceeding the transmission capacity of the first access node, to provide a better QOS for the HPUE, to achieve any other objective, or any combination thereof. Handover of out-of-network HPUE can be prioritized over in-network HPUE, or vice versa.

A maximum allowable power of the HPUE can be reduced so that the HPUE operates in the standard power mode. The HPUE can have been operating in an enhanced power mode when the reduction in maximum allowable power occurs. Alternatively, the HPUE can have been operating in a standard power mode when the reduction in maximum allowable power occurs. The maximum allowable power reduction can occur in a single step or in multiple steps over which maximum allowable power is reduced incrementally. When maximum allowable power reduction is performed incrementally, handover of the HPUE can occur before, during, or after the incremental reduction. Incremental maximum power reduction can be cancelled at any time. A handover can then be initiated, and the maximum allowable power reduction resumed or performed again.

The first and second access nodes can communicate on the same primary carrier frequency, at least one common secondary carrier frequency, or both. Communication frequencies can be the same for download, upload, or both. For example, the first and second access nodes can be part of a common wireless network in which all or substantially all access nodes share a common set of carrier frequencies, or share at least one carrier frequency on download, upload, or both. Carrier frequencies can be aggregated. Carrier frequencies can be constant or can vary over time due to a predetermined schedule or in response to a trigger, exceeding a parameter threshold, or any combination thereof. One or more access nodes can maintain a constant frequency or set of frequencies in the wireless network. One or more access nodes can change a frequency or a set of frequencies in the wireless network. During one or more time periods, adjacent cells and/or nodes can share one or more carrier frequencies in common. The methods and systems of the present disclosure are particularly useful during such time periods.

At least one of the handover and the power decrease can occur when frequency interference measured at the first access node exceeds a threshold interference. The interference measured can be interference on one or more frequencies. The interference measured can be the interference within a cell or between cells. The threshold interference can be constant or can vary over time. The threshold interference can be determined, for example, based on a QOS or other parameter, alone or in combination.

There can be more than one threshold to be exceeded before one or both of the handover and power decrease occur. For example, there can be a threshold interference on two or more frequencies such as a primary frequency and one or more secondary frequencies, or on two or more frequencies such as two or more secondary frequencies. Once both (or more) threshold are exceeded, the handover and/or maximum allowable power reduction can occur. Threshold interferences, with respect to degree or frequency, can be the same or different for handover and maximum allowable power reduction. For example, separate thresholds can be set for handover and power reduction on the same frequency. If the first interference threshold is exceeded, then handover can occur. If the second threshold is exceeded, then the maximum power reduction can occur. The order can be reversed. The interference threshold for handover can be set for a first frequency and the interference threshold for maximum power reduction can be set for a second frequency. The threshold levels can be the same or different for the first and second frequencies. For handover and/or power reduction, same or different interference thresholds can be set across two or more different frequencies. Interference thresholds for handover and/or power reduction can be based, for example, on an aggregated interference taking into consideration interference on two or more frequencies.

Figure 5:
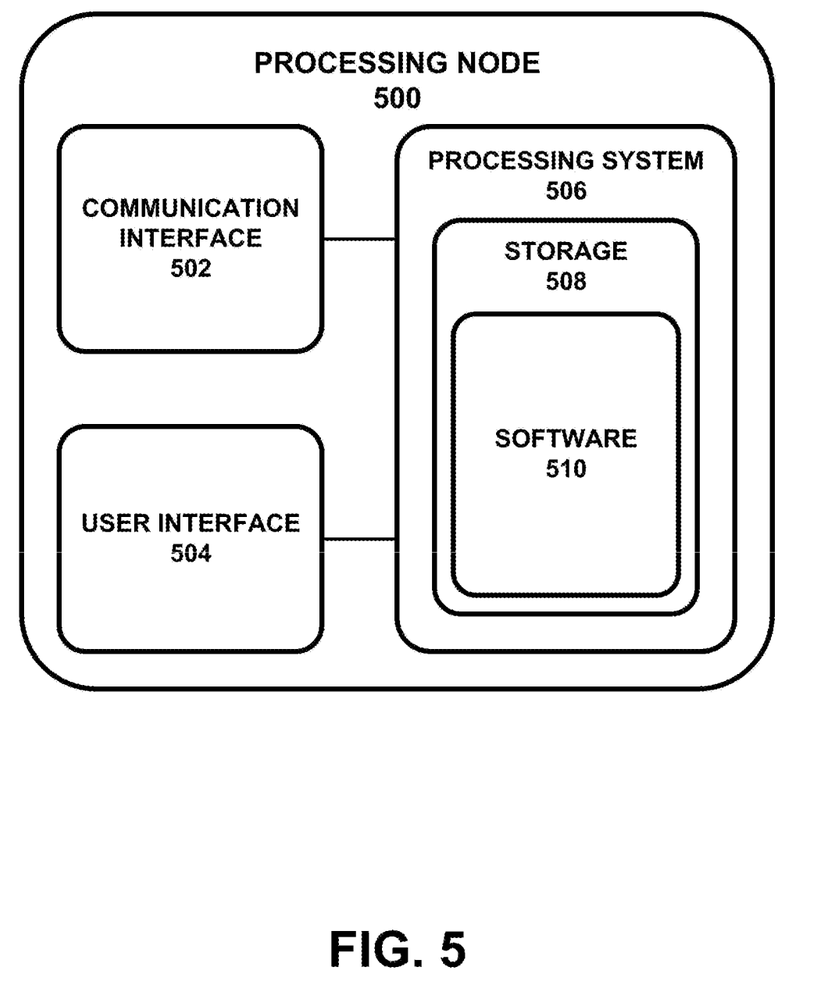
FIG. 5 is a schematic diagram depicting an exemplary processing node in accordance with the present disclosure.

FIG. 5 illustrates an exemplary processing node 500 in a communication system. Processing node 500 can comprise communication interface 502, user interface 504, and processing system 506 in communication with communication interface 502 and user interface 504. Processing node 500 can be configured to determine a communication access node for a wireless device. Processing system 506 can include storage 508, which can comprise a disk drive, flash drive, memory circuitry, or other memory device. Storage 508 can store software 510 that is used in the operation of the processing node 500. Storage 508 can include a disk drive, flash drive, data storage circuitry, or some other memory apparatus. Software 510 can include computer programs, firmware, or some other form of machine-readable instructions, including an operating system, utilities, drivers, network interfaces, applications, or some other type of software. Processing system 506 can include a microprocessor and other circuitry to retrieve and execute software 510 from storage 508. Processing node 500 can further include other components such as a power management unit, a control interface unit, or the like. Communication interface 502 permits processing node 500 to communicate with other network elements. User interface 504 permits the configuration and control of the operation of processing node 500.

Examples of processing node 500 include access nodes, network nodes, gateway nodes, and controller nodes. A processing node 500 can also be an adjunct or component of a network element, such as an element of one or more of an access node, a network node, a gateway node, and a controller node. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium can be any data storage device that can store data readable by a processing system, and can include both volatile and nonvolatile media, removable and non-removable media, and contemplates media readable by a database, a computer, and various other network devices.

Examples of the computer-readable recording medium include, for example, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above.

What is claimed is:

1. A method of reducing frequency interference in a communication system, the method comprising:
    detecting a high-power user equipment (HPUE) operating in an enhanced power mode in a second cell overlap region defined by a serving cell and a target cell neighboring and overlapping the serving cell, the HPUE in communication with a first access node of the serving cell, wherein:
        the HPUE is already operating in the enhanced power mode when first detected in the second cell overlap region;
        the serving cell comprises the first access node, a serving cell low-power user equipment (LPUE) cell edge, and a serving cell HPUE cell edge;
        the target cell comprises a second access node, a target cell LPUE cell edge, and a target cell HPUE cell edge;
        a first cell overlap region defined by the serving cell LPUE cell edge and the target cell LPUE cell edge;
        the second cell overlap region is defined by the serving cell HPUE cell edge and the target cell LPUE cell edge, the second cell overlap region comprising the first cell overlap region; and
        an annular sector comprising a portion of the second cell overlap region outside of the first cell overlap region;
    maintaining the HPUE in the enhanced power mode until at least a handover to the second access node occurs;
    handing over the HPUE to the second access node;
    reducing a maximum allowable power of the HPUE in the annular sector to operate in a standard power mode, wherein the maximum allowable power of the HPUE in the enhanced power mode differs by at least 3 dB from the maximum allowable power in the standard power mode; and
    increasing the maximum allowable power of the HPUE so that the HPUE is again permitted to operate in the enhanced power mode when the HPUE leaves the second cell overlap region and is within the target cell LPUE cell edge.

2. The method of claim 1, wherein the detecting first occurs when the HPUE is in the first cell overlap region.

3. The method of claim 1, wherein one or both of the detecting and the handover occurs when the HPUE is in the annular sector.

4. The method of claim 3, wherein the handover occurs in the annular sector.

5. The method of claim 1, wherein the maximum allowable power increase occurs when frequency interference measured at the second access node drops below a threshold interference after the HPUE leaves the second cell overlap region.

6. The method of claim 1, wherein the serving and target cells are both time division duplexing (TDD) cells.

7. The method of claim 1, wherein the first and second access nodes communicate on a same primary carrier frequency on uplink, downlink, or both.

8. The method of claim 1, wherein the first and second access nodes communicate on at least one secondary carrier frequency in common on uplink, downlink, or both.

9. The method of claim 1, wherein the first and second access nodes both communicate on downlink using carrier frequency aggregation.

10. The method of claim 1, wherein at least one of the handover and the maximum allowable power reduction occur when frequency interference measured at the first access node exceeds a threshold interference.

11. The method of claim 1, wherein HPUEs operating in the enhanced power mode in the annular sector are prioritized for the handover.

12. The method of claim 1, wherein the detecting, the handover, and the maximum allowable power reduction occurs when the HPUE is in the annular sector.

13. A communication system for reducing frequency interference, the system comprising:
    a serving cell comprising:
        a first access node,
        a serving cell low-power user equipment (LPUE) cell edge, and
        a serving cell high-power user equipment (HPUE) cell edge;
    a target cell, neighboring and overlapping the serving cell, comprising:
        a second access node,
        a target cell LPUE cell edge, and
        a target cell HPUE cell edge;
    a first cell overlap region defined by the serving cell LPUE cell edge and the target cell LPUE cell edge;
    a second cell overlap region defined by the serving cell HPUE cell edge and the target cell LPUE cell edge, the second cell overlap region comprising the first cell overlap region; and
    an annular sector comprising a portion of the second cell overlap region outside of the first cell overlap region;
    wherein the first access node is configured to:
        detect a HPUE operating in an enhanced power mode in the second cell overlap region, wherein the HPUE is already operating in the enhanced power mode when first detected in the second cell overlap region,
        maintain the HPUE in the enhanced power mode until at least a handover to the second access node occurs,
        handover the HPUE in the annular sector operating in an enhanced power mode to the second access node; and
    the second access node is configured to:
        reduce a maximum allowable power of the HPUE in the annular sector to operate in a standard power mode, wherein the maximum allowable power of the HPUE in the enhanced power mode differs by at least 3 dB from the maximum allowable power in the standard power mode, and
        increase the maximum allowable power of the HPUE so that the HPUE is again permitted to operate in the enhanced power mode when the HPUE leaves the second cell overlap region and is within the target cell LPUE cell edge.

14. The system of claim 13, wherein the first and second access nodes are configured to communicate on a same primary carrier frequency on uplink, downlink, or both.

15. The system of claim 13, wherein the first and second access nodes are configured to communicate on at least one secondary carrier frequency in common on uplink, downlink, or both.

16. A method of reducing frequency interference in a communication system, the method comprising:
  detecting a high-power user equipment (HPUE) operating in an enhanced power mode with a first access node beyond a range of a low-power user equipment (LPUE) or a HPUE operating in a standard power mode, wherein the HPUE is already operating in the enhanced power mode when first detected in the range, and a maximum allowable power of the HPUE in the enhanced power mode differs by at least 3 dB from the maximum allowable power in the standard power mode;
  maintaining the HPUE in the enhanced power mode until at least a handover to a second, neighboring access node occurs;
  handing over the HPUE to the second, neighboring access node;
  reducing a maximum allowable power of the HPUE after the handover so that the HPUE begins operating in the standard power mode, wherein a maximum allowable power increase is permitted after the HPUE begins operating in the standard power mode; and
  increasing the maximum allowable power of the HPUE so that the HPUE is again permitted to operate in the enhanced power mode when the HPUE is within a range of a low-power user equipment (LPUE) or a HPUE operating in a standard power mode with the second, neighboring access node and beyond a range of a HPUE operating in the enhanced power mode with the first access node.

17. The method of claim 16, wherein the first and second access nodes communicate on a same primary carrier frequency, at least one common secondary carrier frequency, or both.

18. The method of claim 16, wherein at least one of the handover and the maximum allowable power reduction occur when frequency interference measured at the first access node exceeds a threshold interference.

* * * * *